Jan. 1, 1957 R. LO PRESTI 2,776,033
PORTABLE BELT CONVEYOR
Filed Dec. 1, 1953 2 Sheets-Sheet 1

INVENTOR.
ROY LO PRESTI
BY
Murray A. Gleeson
ATTORNEY

Jan. 1, 1957                R. LO PRESTI                 2,776,033
                        PORTABLE BELT CONVEYOR
Filed Dec. 1, 1953                                    2 Sheets-Sheet 2
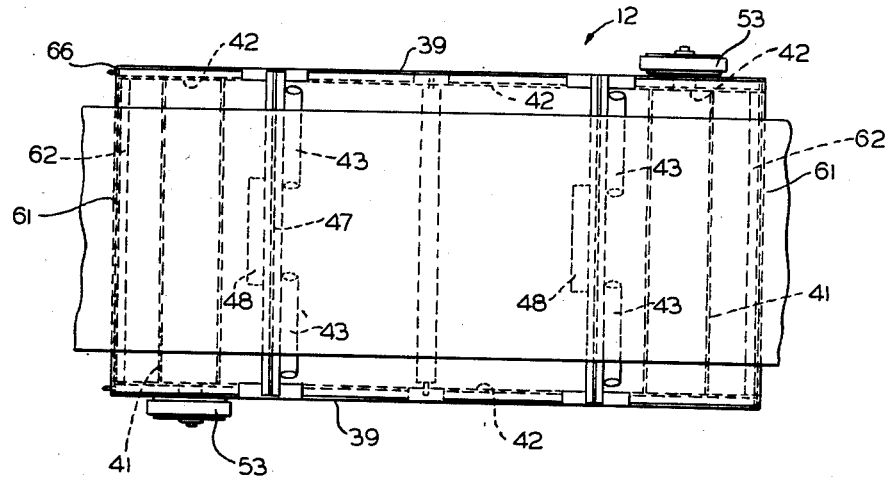
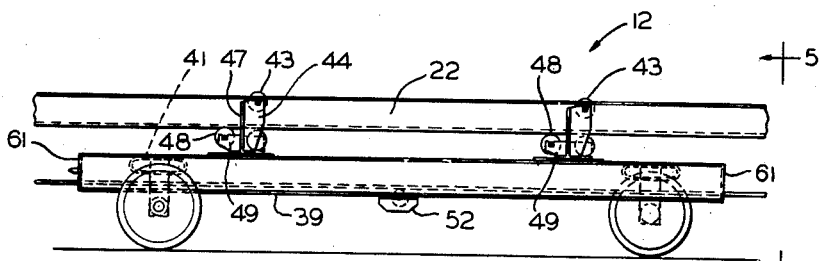
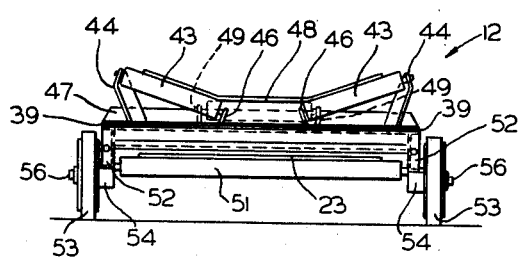
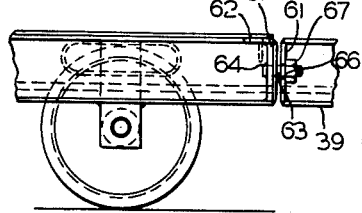
INVENTOR.
ROY LO PRESTI
BY
Murray G. Gleeson
ATTORNEY

United States Patent Office 2,776,033
Patented Jan. 1, 1957

2,776,033

PORTABLE BELT CONVEYOR

Roy Lo Presti, Chicago, Ill., assignor to Goodman Manufacturing Company, Chicago, Ill., a corporation of Illinois Application December 1, 1953, Serial No. 395,434

6 Claims. (Cl. 198—233)

This invention relates generally to belt conveyors, and more particularly to the construction of detachable conveyor sections forming such a conveyor.

The practice of continuous mining by the room end pillar method makes it necessary to provide means for removing coal at a rate at least equal to the production of the continuous miner. In such mining method it has become the practice to have the continuous miner followed by a shuttle conveyor which advances in accordance with the rate of advancement of the continuous miner.

Heretofore such shuttle conveyors have consisted of conveyor sections each mounted upon a pair of wheels mounted at opposite ends of a fixed cross axle in a manner similar to a two wheeled trailer. Each of the conveyor sections have been bolted or otherwise secured to an adjoining conveyor section in what might be considered tandem relationship.

However, in joining such conveyor sections by a rigid connection, such previous methods of construction have not been able to preserve their alignment, which condition is known as "snaking." It is therefore difficult if not impossible to maintain proper alignment of both the conveying and return reaches of the conveyor belt supported on the so connected sections.

Such "snaking" of the conveyor sections is caused by forces in directions parallel to the axle upon which the wheels of each section are supported. Such forces create a couple tending to rotate each of the sections with the center point of the axle as a turning center.

In correcting such tendency of the conveyor to snake it has heretofore been the practice to guide the entire conveyor between vertical guide rollers disposed on each side thereof and spaced throughout its length. The provision of such additional guiding equipment results in a greater down time when the conveyor is being advanced behind the continuous miner, since such extra guide rollers must be spotted in position in accordance with the advance of the conveyor and the continuous miner.

It has been found that if the wheels supporting the conveyor section are disposed one each side of the conveyor section and spaced longitudinally of such section, the conveyor sections when bolted together will not snake in the manner as previously described.

With the foregoing considerations in mind it is a principal object of the invention to provide an improved conveyor section which may be connected readily to like conveyor sections, and which when so connected will not be subject to the snaking condition described, and which will make unnecessary the use of guiding rollers to maintain the sections in proper alignment.

Another object is to provide a belt conveyor made up of a number of rigidly connected sections, such sections when so connected being free from any tendency to snake, so that both the conveying and return reaches of the belt of such conveyor will be properly guided at all times.

Another object is to provide conveyor sections for such a belt conveyor, each section being essentially symmetrical about a center point thereof, so that even if the conveyor sections are reversed in end to end relationship they may still be connected one to the other.

Other objects and important features of the invention will be apparent from a study of the following specification taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the subjoined claims.

In the drawings:

Fig. 3 is a plan view of one of the intermediate sections shown in Figs. 1 and 2 and to a larger scale;

Fig. 4 is a front elevational view thereof;

Fig. 5 is an end view thereof taken along the line 5—5 shown in Fig. 4 and looking in the direction of the arrows; and Fig. 6 is an enlarged detailed front elevational view of an end of the conveyor shown in Fig. 4, showing a fastening connection.

Figure 1:
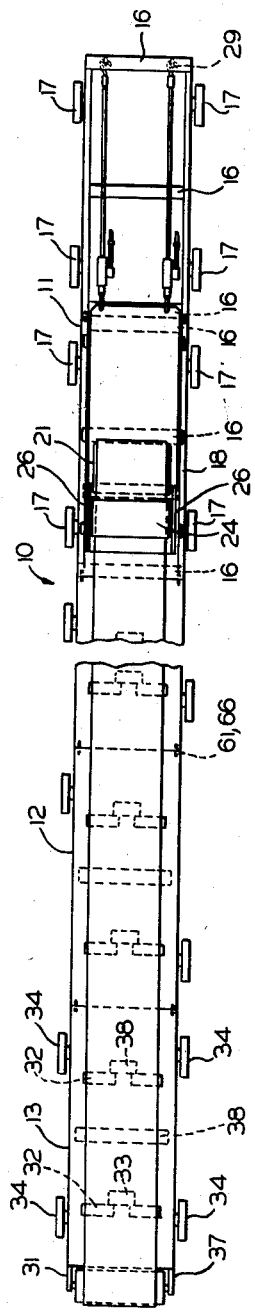
Fig. 1 is a schematic plan view of a belt conveyor having embodied therein the improvements according to the present invention.
Figure 2:
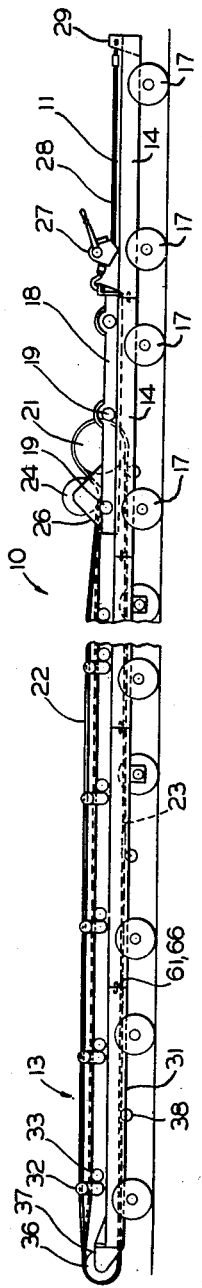
Fig. 2 is a front elevational view thereof.

Referring now to Figs. 1 and 2 of the drawings, the improved conveyor according to the present invention is referred to generally by the reference numeral 10 and includes an outby power section 11, intermediate sections 12, and an inby or material receiving section 13.

The outby section 11 consists of spaced channel members 14, 14 held in such relationship by cross members 16. Each of the outby sections 11 is mounted upon wheels 17 so that the section may be propelled from place to place as desired. The spaced channel members 14 provide a support for a carriage 18 mounted upon rollers 19 guided along the upper flanges of the spaced channel members 14.

A driving roller 21 is supported on the carriage 18, and an upper conveying reach 22 and a lower return reach 23 of the belt is trained therearound. The driving roller 21 is of the type having its driving motor wholly enclosed therein. The upper conveying reach 22 is guided beneath an idler roller 24 supported in spaced standards 26 extending upward from the carriage 18 and spaced but a slight distance from the driving roller 21.

The tension in the belt may be adjusted by moving the carriage 18 through the means of a pair of hand operated winches 27 which are hooked to the carriage 18, each winch engaging a chain 28 anchored at 29 to the end of the outby section 11.

Both the conveying reach 22 and the return reach 23 of the conveyor belt are guided over the intermediate sections 12 as seen in Figs. 1 and 2, and the inby section 13 of the conveyor 10 includes spaced channel members 31 affording a support for troughing rollers 32 and bottom supporting rollers 33, which may be mounted on the spaced channel members 31 in any convenient fashion. As with the outby section 11, the inby section 13 is similarly mounted upon wheels 34, so that the inby section 13 may be transported within the mine.

The lower return reach 23 of the conveyor belt is reversed in direction about an idler drum 36 mounted upon spaced supports 37 at the inby end of the conveyor section 13. As seen in Fig. 2, the return reach of 23 of the belt is guided over a return idler roller 38.

Referring now to Figs. 3 to 6 inclusive of the drawings, the intermediate conveyor sections 12 are each constructed of laterally spaced channel members 39, 39 which are maintained in proper spaced relationship by means of flattened tubular members 41 which are welded at their ends to the webs 42 of the channel members 39.

The conveying reach 22 is guided over the intermediate trough section 12 by means of inclined idler rollers 43 supported at their upper ends on brackets 44 and at their lower ends by brackets 46 extending upward from a T-shaped member 47 straddling the channel members 39, 39. The upper reach 22 is also guided upon a center load supporting roller 48 supported at each end upon a bracket 49 also supported by the cross member 47.

The return reach 23 is guided on an idler roller 51 supported at each end on a bracket 52 depending from the spaced channel members 39.

As seen in Figs. 3, 4 and 5 each of the intermediate sections 12 is arranged to be moved upon a pair of wheels 53. These wheels are preferably mounted symmetrically with respect to a point O on the section 12. Each of the wheels 53 is arranged to be mounted on a block 54 secured to the underside of the channel member 39, said block having a stub axle extension 56 for the wheel 53. Means, not shown, is employed to hold the wheel 53 to the axle 56.

The stub axles 56 have their axes extending laterally and horizontally of the side channel members 39 in parallel relationship to each other.

Referring now to Fig. 6, each end of the intermediate section 12 is provided with an end plate 61 having its ends welded to the spaced channel members 39, said end plate 61 being additionally stiffened by an angle member 62 welded at its ends to the webs 42 of the spaced channel members 39. The end plate 61 provides a means whereby the conveyor sections 12 may be rigidly secured together, by a simple fastening means which will now be described.

Such fastening means consists of threaded pins or bolts extending from the end of each section which enter a mating drilled hole in an adjoining conveyor section. These fastening means are preferably mounted at a pair of diagonally opposite corners, and each consists of a threaded pin 63 welded at 64 to the end plate 61. The threaded end of the pin is arranged to enter a bored hole 66 of an adjoining section, and each section accordingly has its other pair of diagonally opposite corners provided with such holes 66. Adjoining sections may thereby be securely bolted together by means of a nut 67 threaded to the pin 63.

The inby conveyor section 13 and the outby conveyor sections 11 may be likewise secured to the intermediate sections 12.

The provision of the simple means for securing the conveyor sections together, that is, the threaded pin 63 and the cooperating nut 67, makes a rigid structure capable of but slight deformations. By the provision of the securing means described, the sections may also be coupled in opposite end to end relationship.

However, the disposition of the wheels 53 on each conveyor section 12 on turning axes extending laterally of the side frame members and in parallel relationship to each other, as previously described, prevents each of the sections from responding to lateral forces which in the usual case would make a turning couple for each of the sections about the center of the axle for their oppositely mounted wheels.

Only the conveyor sections are secured in position in the manner as previously described, the diagonally located wheels may move only in such a direction as to cause the entire conveyor to move in a straight line longitudinally, but never in such a fashion as to cause the individual sections to tend to turn with respect to each other.

Any lateral thrusts against the so connected conveyor sections will cause the wheels merely to slip laterally on the mine floor.

While the wheels have been described as being symmetrical about the point O on the structure such construction is only for purposes of symmetry, and any arrangement whereby the wheels are not disposed opposite each other on a common cross axle will perform quite as well as the construction described.

While the invention has been described in terms of a preferred embodiment thereof, its scope is intended to be defined only by the terms of the claims here appended.

I claim as my invention:

1. A belt conveyor comprising individual portable sections mounted upon wheels for portability thereof, said sections being capable of being rigidly secured together so that irrespective of being mounted upon wheels the so connected sections will not "snake," each of said sections including spaced frame members affording a support for the upper and lower reaches of a conveying belt, each of said sections being provided with a single pair of wheels and including means for mounting said wheels on said frame members, said wheels being disposed one on each side of said frame members and having turning centers located on axes extending laterally and horizontally of said frame members and spaced from each other in parallelism, a plate at each end of said sections extending between said frame members, a threaded pin connector disposed at opposite diagonal corners of said sections and supported by said end plates, and a complementary opening to a threaded pin at the other opposite diagonal corners of each section and located in said end plates, and a nut threaded to each pin to hold said sections together rigidly.

2. A belt conveyor comprising individual portable sections mounted upon wheels for portability thereof, said sections being capable of being rigidly secured together so that irrespective of being mounted upon wheels the so connected sections will not "snake," each of said sections including spaced frame members affording a support for the upper and lower reaches of a conveying belt, each of said sections being provided with a single pair of wheels and including means for mounting said wheels on said frame members, said wheels being disposed one on each side of said frame members and having turning centers located on axes extending laterally and horizontally of said frame members and spaced from each other in parallelism, a plate at each end of said sections extending between said frame members, and connecting means for said sections comprising male and female connectors on each end plate.

3. A belt conveyor comprising individual portable sections mounted upon wheels for portability thereof, said sections being capable of being rigidly secured together so that irrespective of being mounted upon wheels the so connected sections will not "snake," each of said sections including spaced frame members affording a support for the upper and lower reaches of a conveying belt, each of said sections being provided with a single pair of wheels and including means for mounting said wheels on said frame members, said wheels being disposed one on each side of said frame members and having turning centers located on axes extending laterally and horizontally of said frame members and spaced from each other in parallelism, an end plate at each end of said sections arranged to be in abutting relationship with the end plate of an adjoining section, and means for connecting said plates in rigid relationship.

4. A belt conveyor comprising individual portable sections mounted upon wheels for portability thereof, said sections being capable of being rigidly secured together so that irrespective of being mounted upon wheels the so connected sections will not "snake," each of said sections including spaced frame members affording a support for the upper and lower reaches of a conveying belt, each of said sections being provided with a single pair of wheels and including means for mounting said wheels on said frame members, said wheels being disposed one on each side of said frame members and having turning centers located on axes extending laterally and substantially horizontally of said frame members and spaced from each other in parallelism, and means for connecting said sections together rigidly comprising a threaded pin at opposite diagonal corners of each said sections, and a complementary opening to a threaded pin at the other opposite diagonal corners of each section, and a nut threaded to each pin to hold said sections together.

5. A belt conveyor comprising individual portable sections mounted upon wheels for portability thereof, said sections being capable of being rigidly secured together so that irrespective of being mounted upon wheels the so connected sections will not "snake," each of said sections including spaced frame members affording a support for the upper and lower reaches of a conveying belt, each of said sections being provided with a single pair of wheels and including means for mounting said wheels on said frame members, said wheels being disposed one on each side of said frame members and having turning centers located on axes extending laterally and substantially horizontally of said frame members and spaced from each other in parallelism, and means for connecting said sections together rigidly comprising male and female connectors at each end of said sections.

6. A belt conveyor comprising individual portable sections mounted upon wheels for portability thereof, said sections being capable of being rigidly secured together so that irrespective of being mounted upon wheels the so connected sections will not "snake," each of said sections including spaced frame members affording a support for the upper and lower reaches of a conveying belt, each of said sections being provided with a single pair of wheels and including means for mounting said wheels on said frame members, said wheels being disposed one on each side of said frame members and having turning centers located on axes extending laterally and substantially horizontally of said frame members and spaced from each other in parallelism, and means for connecting said sections together rigidly.

References Cited in the file of this patent

UNITED STATES PATENTS

| | | |
|---|---|---|
| 1,775,021 | Dolan | Sept. 2, 1930 |
| 2,205,013 | Joy | June 18, 1940 |
| 2,338,359 | Sharp | Jan. 4, 1944 |